(12) United States Patent
Yokouchi et al.

(10) Patent No.: US 7,332,209 B2
(45) Date of Patent: Feb. 19, 2008

(54) LAMINATED STRUCTURE FORMED OF THIN PLATES

(75) Inventors: Tsutomu Yokouchi, Kanagawa (JP); Toshiya Kojima, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 254 days.

(21) Appl. No.: 10/950,578

(22) Filed: Sep. 28, 2004

(65) Prior Publication Data

US 2005/0100727 A1    May 12, 2005

(30) Foreign Application Priority Data

Sep. 29, 2003  (JP) ............................. 2003-338832

(51) Int. Cl.
*B32B 3/00* (2006.01)
*B32B 3/30* (2006.01)
*B41J 2/045* (2006.01)

(52) U.S. Cl. ..................... 428/166; 428/167; 428/172; 428/188; 347/71; 347/92

(58) Field of Classification Search ............... 428/119, 428/120, 166, 172, 178, 188, 167; 347/71, 347/92
See application file for complete search history.

(56) References Cited

U.S. PATENT DOCUMENTS 2,354,725 A * 8/1944 Weyerhaeuser ............... 428/76
5,252,994 A * 10/1993 Narita et al. ................... 347/71
6,033,059 A * 3/2000 Wen et al. ..................... 347/71
6,361,155 B1    3/2002 Kanda et al.
6,536,879 B2 * 3/2003 Ito et al. ........................ 347/71
2002/0036678 A1   3/2002 Ito et al.
2003/0048337 A1 * 3/2003 Jones et al. .................... 347/86

FOREIGN PATENT DOCUMENTS

| JP | 5-330067 A | 12/1993 |
|---|---|---|
| JP | 2000-79693 A | 3/2000 |
| JP | 2001-63052 A | 3/2001 |
| JP | 2001-162802 A | 6/2001 |
| JP | 2002-096478 A | 4/2002 |
| JP | 2002-240272 A | 8/2002 |

* cited by examiner

*Primary Examiner*—Donald J. Loney
(74) *Attorney, Agent, or Firm*—Birch, Stewart, Kolasch & Birch, LLP (57) ABSTRACT

The laminated structure comprises: a plurality of thin plate members; and adhesive which bonds the plurality of thin plate members in layers, wherein: at least one of the plurality of thin plate members has at least one bonding surface to be bonded with a surface of another of the plurality of thin plate members with the adhesive; at least one groove is formed in a breadthways direction of the thin plate member on the bonding surface; and at least one of ends of the groove does not reach an edge of the thin plate member.

13 Claims, 8 Drawing Sheets

LAMINATED STRUCTURE FORMED OF THIN PLATES

This Nonprovisional application claims priority under 35 U.S.C. § 119(a) on Patent Application No(s). 2003-338832 filed in Japan on Sep. 29, 2003, the entire contents of which are hereby incorporated by reference.

BACKGROUND OF THE INVENTION

1. Field of the Invention

The present invention relates to a laminated structure formed of thin plates, and more particularly, to a laminated structure formed of thin plates in which a plurality of thin plate members are arranged in layers and bonded together by means of adhesive.

2. Description of the Related Art

In a print head installed in an inkjet recording apparatus (inkjet printer), a three-dimensional structure is formed by layering together a plurality of thin plate members (cavity plates), to a high degree of accuracy. For example, a thin plate member formed with a plurality of nozzle openings, and thin plate members formed with pressure chambers provided for the respective nozzles, openings, recesses, projections, and holes corresponding to ink flow channels, and the like, are arranged in layers and bonded together by means of adhesive material or adhesive sheet.

A thermosetting adhesive which can be hardened by means of heat, or an ultraviolet-setting adhesive which can be hardened by irradiating ultraviolet radiation, is used as the adhesive for bonding these thin plate members. Moreover, various methods have been devised for ensuring prescribed rigidity, strength and adhesive performance.

The adhesive is uniformly applied onto at least one of the surfaces that are to be bonded together (bonding surfaces) in a thin layer by means of a coating apparatus, or the like, but surplus adhesive may arise. A method is known in which escape grooves for adhesive and air bubbles are provided in such a manner that this surplus adhesive does not block up the openings, and the like, formed in the thin plate members, or in such a manner that no air bubbles are left between the thin plate members bonded together. These escape grooves should communicate with the outside air, in order that the adhesive and air bubbles can escape efficiently.

Japanese Patent Application Publication No. 2002-96478 discloses a laminated and bonded construction of thin plate parts, in which through holes communicating with adhesive escape grooves are provided, and these communicate with the outside air in the direction of the thickness of the thin plate parts, thereby allowing the air bubbles remaining between the plate parts to escape.

Japanese Patent Application Publication No. 2002-240272 discloses an inkjet printer, in which a structure is adopted wherein escape grooves are formed on only one of the surfaces to be bonded, thereby allowing the surplus adhesive to escape.

Japanese Patent Application Publication No. 2001-63052 discloses an ink-jet recording head and a method of manufacturing the inkjet recording head, in which a plurality of grooves are provided at intervals, and when plates formed with these grooves are bonded together, the grooves form linked grooves which communicate with the outside air, and the air bubbles remaining in the region of the plate junction can be made to escape into the outside air via these grooves.

However, in the case of a head of a long dimension in the lengthwise direction, such as a line head, if the grooves extend to the ends of the thin plate members, in such a manner that the two ends of the grooves in the breadthways direction parallel to the shorter edges of the head communicate with the outside air, then the rigidity of the thin plate members declines, and furthermore, the thin plate member may warp when the grooves are processed. There is also a possibility that the thin plate members may warp when the adhesive hardens. This decline in rigidity and the occurrence of warping in the thin plate members cause a decline in the performance of the head.

In the laminated and bonded construction of thin plate parts disclosed in Japanese Patent Application Publication No. 2002-96478, when a plurality of thin plate parts have been bonded together, air bubbles remaining in the sandwiched thin plate part cannot escape readily via the through holes provided in the thickness direction. Furthermore, the adhesive in the sandwiched thin plate part cannot escape readily either.

Moreover, in the inkjet printer disclosed in Japanese Patent Application Publication No. 2002-240272, no consideration is given to warping of the plates.

Furthermore, in the inkjet recording head and method of manufacturing the ink-jet recording head disclosed in Japanese Patent Application Publication No. 2001-63052, it is possible that the grooves may not link together, if the processing accuracy or bonding accuracy of the plates is low.

SUMMARY OF THE INVENTION

The present invention is contrived in view of such circumstances, and an object thereof is to provide a laminated structure formed with thin plate members which allows adhesive and air bubbles to escape efficiently, while also ensuring rigidity in the thin plate members and restricting warping of same.

In order to attain the aforementioned object, the present invention is directed to a laminated structure, comprising: a plurality of thin plate members; and adhesive which bonds the plurality of thin plate members in layers, wherein: at least one of the plurality of thin plate members has at least one bonding surface to be bonded with a surface of another of the plurality of thin plate members with the adhesive; at least one groove is formed in a breadthways direction of the thin plate member on the bonding surface; and at least one of ends of the groove does not reach an edge of the thin plate member.

According to the present invention, since the groove is arranged on the bonding surface of the thin plate member and the groove is formed to a length whereby at least one end thereof does not reach an edge of the thin plate member, then it is possible to ensure the rigidity of the thin plate member.

The bonding surface is a surface to be bonded with another thin plate member, and it may be provided with a bonding region on which adhesive is applied. It is also possible to perform bonding by means of adhesive applied onto the other thin plate member, without providing the bonding surface with a bonding region.

If three or more thin plate members are to be bonded together, then both the front and rear surfaces of the intermediately positioned thin plate member will form bonding surfaces.

The grooves may include hollows, recesses, or the like, formed in the bonding surface. The shape of the grooves as viewed from the bonding surface may be substantially linear, or it may contain a curve. Furthermore, the cross-sectional shape of the grooves may be substantially square, or substantially rectangular, or it may another shape.

Preferably, the groove is a single-edge-communicating groove, one of the ends of which reaches an edge of the thin plate member. According to this, by making one end of the groove reach the edge of the thin plate member, surplus adhesive on the bonding surface can be caused to escape efficiently, and by preventing the other end of the groove from reaching the edge of the thin plate member, the rigidity of the thin plate member can be ensured.

Preferably, the bonding surface has a plurality of the single-edge-communicating grooves; and the single-edge-communicating grooves include first single-edge-communicating grooves having ends reaching a first edge of the thin plate member, and second single-edge-communicating grooves having ends reaching a second edge of the thin plate member opposite to the first edge. According to this, the rigidity of the substrate can be ensured and furthermore, surplus adhesive on the bonding surfaces can be caused to escape into the grooves.

The first single-edge-communicating grooves and the second single-edge-communicating grooves may be disposed alternately, or a plurality of second single-edge-communicating grooves may be disposed between one first single-edge-communicating groove and another.

Preferably, the bonding surface further has a non-communicating groove having no ends reaching an edge of the thin plate member. According to this, surplus adhesive can be caused to escape through the single-edge-communicating groove, while the non-communicating groove formed to a length whereby neither end reaches the edge of the thin plate member helps to ensure the rigidity of the thin plate member and prevent the thin plate member from warping. Moreover, by combining the first single-edge-communicating grooves, second single-edge-communicating grooves and non-communicating grooves, the surplus adhesive in the central region of the thin plate member can be caused to escape efficiently. Preferably, grooves in the lengthwise direction which communicate with these three types of grooves are also provided.

Preferably, each of both faces of the at least one of the plurality of thin plate member includes the bonding surface. The patterns of grooves formed on the two bonding surfaces may be same or they may be different.

Preferably, the grooves formed on one of the bonding surfaces are arranged in same positions with respect to the grooves formed on the other of the bonding surfaces. According to this, by adopting a corresponding upper and lower structure (on the front and rear surfaces), it is possible to prevent the thin plate member from warping after lamination and bonding.

Alternatively, it is also preferable that the grooves formed on one of the bonding surfaces are arranged in different positions with respect to the grooves formed on the other of the bonding surfaces. According to this, in cases where the rigidity of the thin plate member cannot be ensured if the grooves are situated in the same positions on both bonding surfaces, then a contribution to ensuring rigidity can be made by separating the positions in which the grooves are situated on the two bonding surfaces.

Moreover, in order to attain the aforementioned object, the present invention is also directed to a laminated structure, comprising: a plurality of thin plate members; and adhesive which bonds the plurality of thin plate members in layers, wherein: at least one of the plurality of thin plate members has two bonding surfaces to be bonded with surfaces of others of the plurality of thin plate members with the adhesive; and a groove is formed on each of the bonding surfaces.

According to the present invention, by providing grooves along which surplus adhesive can escape, respectively, on both bonding surfaces of the thin plate member, a symmetrical upper and lower structure is achieved, and therefore it is possible to prevent warping of a laminated structure formed by bonding together the plurality of thin plate members.

Preferably, a depth of the groove is greater than a width of the groove. According to this, by increasing the depth of the grooves without increasing their width, the surplus adhesive on the bonding surface can be made to escape more readily, and furthermore, by restricting the width of the grooves, a large bonding surface area can be ensured and hence bonding strength can be ensured.

Preferably, a width of the groove increases from an interior of the thin plate member towards an edge of the thin plate member. The width of the groove may increase continuously, or it may increase in stages.

Furthermore, in order to attain the aforementioned object, the present invention is also directed to a laminated structure, comprising: a plurality of thin plate members; and adhesive which bonds the plurality of thin plate members in layers, wherein: at least one of the plurality of thin plate members has a bonding surface to be bonded with a surface of another of the plurality of thin plate members with the adhesive; a groove is formed on the bonding surface; and a depth of the groove is greater than a width of the groove.

According to the present invention, the volume (cross-sectional surface area) of the grooves is increased, thereby allowing a larger amount of adhesive to escape. By making the grooves narrow in width, the adhesive on the bonding surfaces can be made to escape readily into the grooves, by capillary action.

According to the present invention, surplus adhesive on a thin plate member, and residual air bubbles remaining between thin plate members, can be caused to escape efficiently, while preventing warping of the thin plate members and ensuring the rigidity of the thin plate members.

BRIEF DESCRIPTION OF THE DRAWINGS

The nature of this invention, as well as other objects and advantages thereof, will be explained in the following with reference to the accompanying drawings, in which like reference characters designate the same or similar parts throughout the figures and wherein.

DETAILED DESCRIPTION OF THE PREFERRED EMBODIMENTS

Below, a preferred embodiment of the present invention is described with reference to the accompanying drawings.

Figure 1:
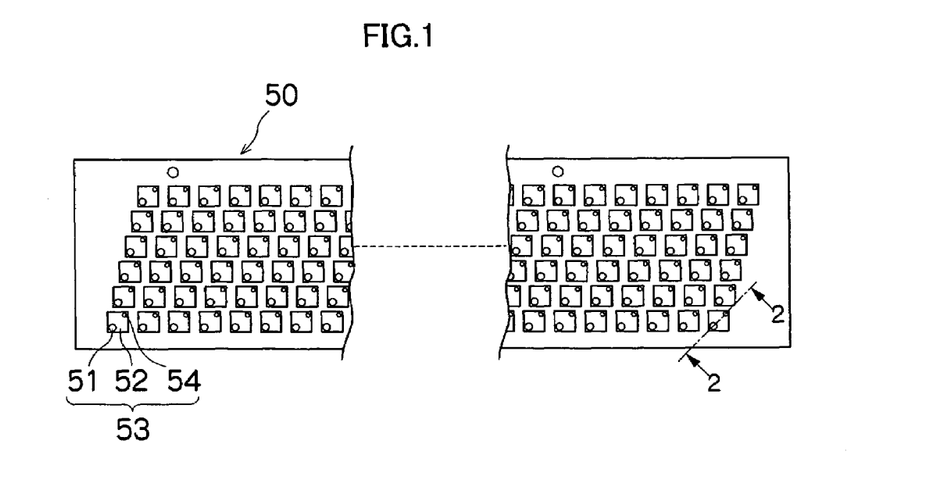
FIG. 1 is a plan view perspective diagram showing an example of the composition of a print head to which an embodiment of the present invention is applied.
Figure 2:
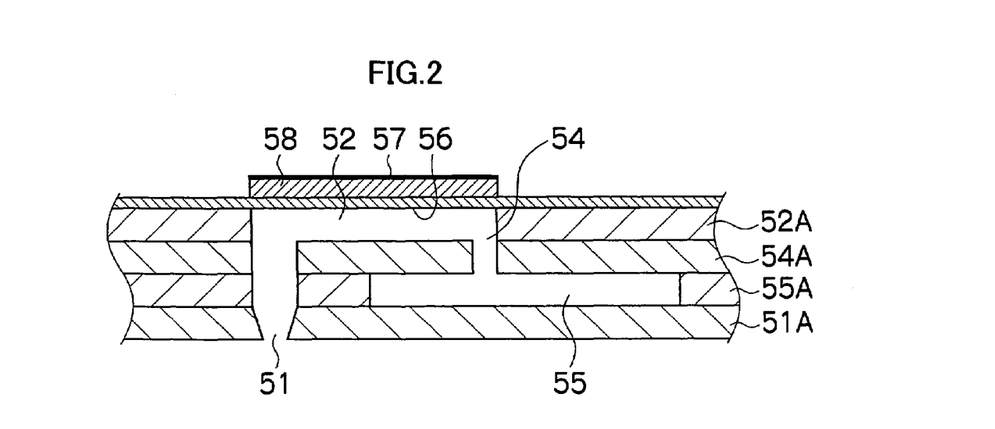
FIG. 2 is a cross-sectional diagram along line 2-2 in FIG. 1.

FIG. 1 is a plan view perspective diagram showing an example of the structure of an inkjet recording head (print head) 50 to which an embodiment of the present invention is applied. FIG. 2 is a cross-sectional diagram (along line 2-2 in FIG. 1) showing the three-dimensional structure of an ink chamber unit of the print head 50.

The print head 50 is a line type head, which has the length in the lateral direction in FIG. 1 corresponding to the maximum paper width and considerably longer than the breadth in the vertical direction in FIG. 1. In order to increase the density of the nozzles by reducing the nozzle pitch, the print head 50 in the present example has a structure wherein a plurality of ink chamber units 53, each comprising a nozzle 51 for discharging ink droplets, a pressure chamber 52 corresponding to the nozzle, and the like, are disposed in a staggered matrix arrangement, as illustrated in FIGS. 1 and 2.

The pressure chamber 52 provided corresponding to each of the nozzles 51 is approximately square-shaped in plan view, and the nozzle 51 and a supply port 54 are provided respectively symmetrical corner sections of the pressure chamber 52. Each pressure chamber 52 is connected via the supply port 54 to a common flow channel 55.

An actuator 58 provided with an individual electrode 57 is bonded to a pressure plate 56, which forms the upper face of the pressure chamber 52, and the actuator 58 is deformed when a drive voltage is applied to the individual electrode 57, thereby causing ink inside the pressure chamber 52 to be discharged through the nozzle 51. When ink is discharged, new ink is supplied to the pressure chamber 52 from the common flow channel 55 through the supply port 54.

In implementing the present invention, the arrangement of the nozzles is not limited to that of the example illustrated. Moreover, a method is employed in the present embodiment where an ink droplet is ejected by means of the deformation of the actuator 58, which is typically a piezoelectric element; however, in implementing the present invention, the method used for discharging ink is not limited in particular, and instead of the piezo jet method, it is also possible to apply various types of methods, such as a thermal jet method where the ink is heated and bubbles are caused to form therein by means of a heat generating body such as a heater, ink droplets being ejected by means of the pressure of these bubbles.

Figure 3:
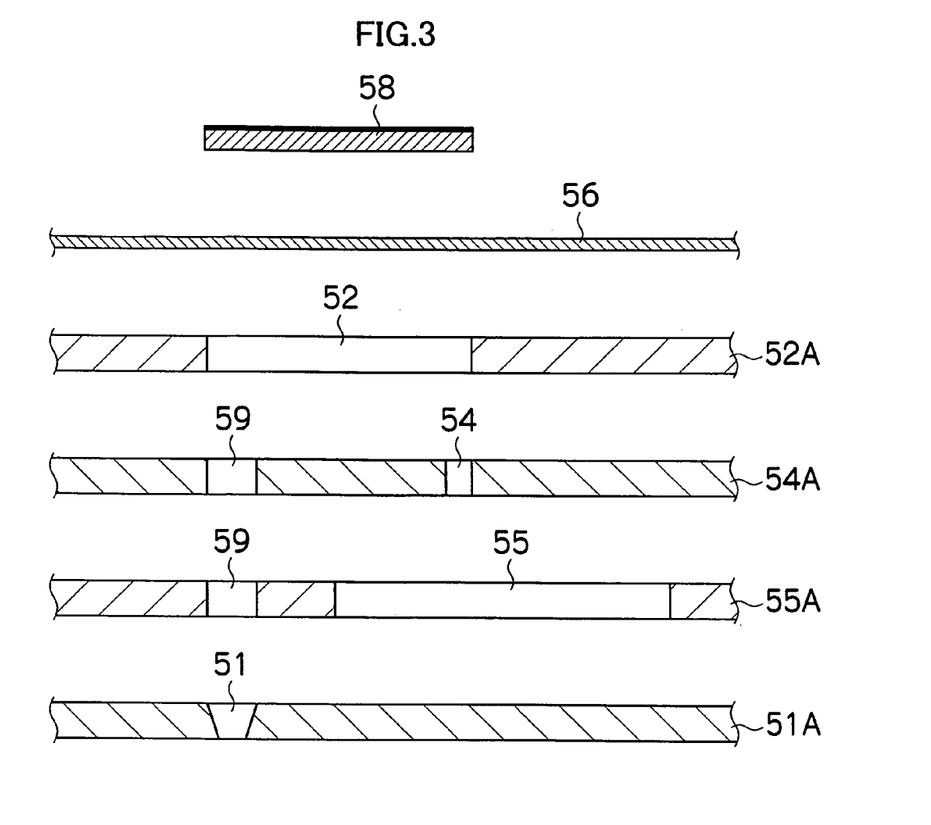
FIG. 3 is an exploded diagram showing the members composing the ink chamber in FIG. 2.

FIG. 3 is an exploded view showing the members composing the ink chamber 53 in FIG. 2, and the laminated construction of the ink chamber 53 is hereby described with reference to FIG. 3. The ink chamber 53 is constructed by successively layering together, from bottom upwards, a nozzle plate 51A formed with the nozzle 51, a common flow channel plate 55A formed with the common flow channel 55 and an ink channel 59 leading to the nozzle 51, a supply port plate 54A formed with the supply port 54 connecting the common flow channel 55 with the pressure chamber 52 and the ink channel 59 leading from the pressure chamber 52 to the nozzle 51, a pressure chamber plate 52A formed with the pressure chamber 52, and the pressure plate 56.

Hereinafter, each of the nozzle plate 51A, the common flow channel plate 55A, the supply port plate 54A, the pressure chamber plate 52A and the pressure plate 56 (i.e., the plate members constituting the respective layers) may be generally referred to as a "thin plate member", which is denoted with a reference numeral 100 in FIG. 4.

In the print head 50 having the ink chambers 53 of this composition, when the actuator 58 is driven, pressure is applied to the ink inside the pressure chamber 52 through the pressure plate 56, and ink is discharged downwards from the nozzle 51.

Although FIGS. 2 and 3 show only one ink chamber 53, a plurality of nozzle openings (through holes) are formed in the nozzle plate 51A in a number corresponding to the number of the plurality of nozzles in the head, for example. Similarly, openings, recesses and grooves are provided in the respective thin plate members, in numbers corresponding to the numbers of liquid chambers, such as the pressure chambers 52, and ink channels, in one head. The junction regions between the thin plate members (the regions where respective surfaces are bonded together) are positioned so as to avoid these openings, holes, recesses, and the like.

It is preferable that key grooves, pins, and holes for positional alignment are provided in the respective thin plate members, in order to ensure the prescribed layering accuracy.

A thermosetting adhesive, an ultraviolet-setting adhesive, or the like, is used for bonding the thin plate members. Warping may occur in the thin plate members if the adhesive undergoes significant change in volume upon setting, and it is hence preferable to use an adhesive that displays little volume change upon setting. The aforementioned adhesive is also used for bonding the pressure plate 56 with the actuator 58, as well as bonding the thin plate members.

As described above, when the thin plate members are arranged in layers and bonded together, the surplus adhesive and the air bubbles remaining between the thin plate members must be allowed to escape.

For example, if surplus adhesive enters into the through holes forming the supply ports 54 when the supply port plate 54A and the common flow channel plate 55A are bonded together, then the diameter of the openings in the supply ports 54 will be reduced, and the supply ports 54 may become blocked. Furthermore, if air bubbles remain on the bonded surfaces between the thin plate members (for example, between the pressure chamber plate 52A and the pressure plate 56), then the air bubbles may enter into the liquid chambers or ink channels, and therefore it may not be possible to ensure the sealing properties of the ink chamber 53, due to these residual air bubbles. This leads in turn to pressure loss, ink leaks, and the like.

Figure 4:
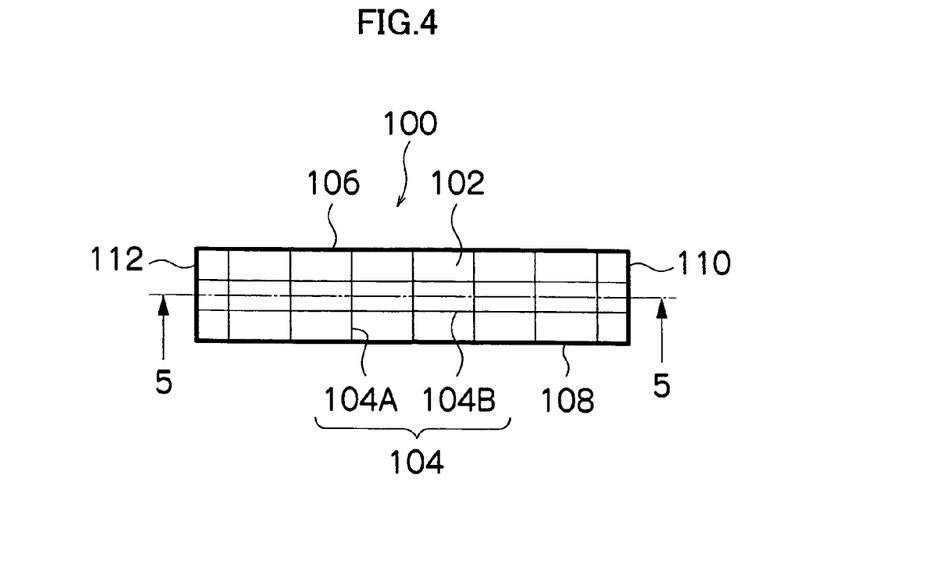
FIG. 4 is a diagram illustrating escape grooves.
Figure 5:
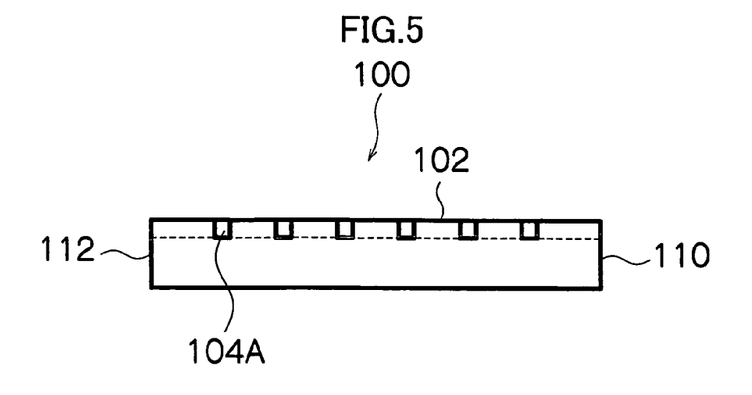
FIG. 5 is a cross-sectional diagram along line 5-5 in FIG. 4.

Therefore, as shown in FIGS. 4 and 5, escape grooves for allowing surplus adhesive or residual air bubbles to escape are provided on a bonding surface 102 of the thin plate member 100.

FIG. 4 is an approximate plan view of the bonding surface 102 of the thin plate member 100, and FIG. 5 is a cross-sectional view along section 5-5 in FIG. 4. Recesses, holes, and the like, formed in addition to the grooves 104 are not illustrated in FIGS. 4 and 5.

Here, the bonding surface 102 is a surface that is to be bonded to the surface of another thin plate member, has a bonding region to be coated with the adhesive. If openings, holes, recesses, or the like, which will subsequently form the ink chamber, the ink channels, or the like, are provided on the bonding surface 102, then the escape grooves 104 are positioned so as to avoid these openings, holes, recesses, or the like, formed in the thin plate member 100.

A screen-printing technique, or the like, which allows a prescribed amount of adhesive to be applied accurately to a prescribed thickness on a designated region, is used to apply adhesive onto the bonding surface (bonding region). It is of course possible to use another applying method.

In FIG. 4, shows the thin plate member 100 having the lengthwise direction (parallel with the longer edges in the lateral direction in FIG. 4) and the breadthways direction (parallel with the shorter edges in the vertical direction in FIG. 4). Escape grooves 104A in the breadth direction and escape grooves 104B in the lengthwise direction are formed on the bonding surface 102 of the thin plate member 100. The escape grooves 104A are substantially parallel to the shorter edges of the thin plate member 100, and are formed so as to extend from one longer edge 106 to the other longer edge 108. Similarly, the escape grooves 104B are substantially parallel to the longer edges of the thin plate member 100, and are formed so as to extend from one shorter edge 110 to the other shorter edge 112. The escape grooves 104A and the escape grooves 104B are connected with each other at their respective points of intersection.

By thus providing the escape grooves that reach to the edges of the thin plate member 100 and communicate with the outside air, the surplus adhesive on the bonded surface 102 and the residual air bubbles between the plates can be efficiently made to escape through the escape grooves 104.

The escape grooves 104 are arranged substantially in parallel with the shorter edges and the longer edges in the present embodiment; however, the escape grooves 104 may also form a certain non-right angle with respect to the directions parallel to the shorter and longer edges. Furthermore, the number of escape grooves 104 is not limited to that depicted in FIGS. 4 and 5, and can be set to a desired number for each thin plate member, depending on the bonding region, forming technique, and the like. Of course, it is also possible to form either the escape grooves 104A or the escape grooves 104B, without forming the other.

If the thin plate members 100 are oval shaped, then the direction of the shorter axis is taken as the direction of the shorter dimension or the breadth direction, and the direction of the longer axis is taken as the direction of the longer dimension or the lengthwise direction. If the thin plate member 100 has an irregular shape, then the direction parallel to the relatively longer edges is taken to be the direction of the longer dimension and the direction parallel to the relatively shorter edges is taken to be the direction of the shorter dimension.

The cross-sectional shape of the escape grooves 104A shown in FIG. 5 is substantially square or quadrilateral; however, it may also be semicircular, or another shape. The cross-sectional shape of the escape grooves 104 depends on the method used to form them. For instance, if the escape grooves 104 are formed by anisotropic etching, then they have a substantially square cross-section with aspect ratio of 1 or less as the escape grooves 104A shown in FIG. 5. If the escape grooves 104 are formed by isotropic etching, then they have a substantially semicircular cross-section with aspect ratio of 0.5. Here, the aspect ratio of an escape groove 104 is the ratio of the depth of the escape groove 104 with respect to the width of the escape groove 104. If the escape groove 104 is not of uniform width, then the aspect ratio is the ratio of the groove depth with respect to the minimum groove width.

The escape groove 104A and the escape groove 104B may be of the same shape, or they may be of different shapes, and if they are of the same shape, they can be formed using the same forming technique.

However, if the escape grooves 104A in the breadthways direction are made to extend to the edges 106 and 108 of the thin plate member 100 and if the escape grooves 104A have a linear shape, then the rigidity of the thin plate member 100 declines and warping is liable to occur in the lengthwise direction of the thin plate member 100. Warping of this kind is especially liable to occur in a long head, such as the line head illustrated in FIG. 1.

Furthermore, if the escape grooves 104 are formed to a substantial depth in order to allow the surplus adhesive to efficiently escape, the width of the escape grooves 104 also increases in accordance with the depth increasing in cases where the escape grooves 104 are formed by wet etching. Then, the bonding area is reduced, the bonding strength declines, and the rigidity of the head falls.

On the other hand, since the escape grooves 104B in the lengthwise direction have relatively little effect on the rigidity or warping (in the breadthways direction) of the thin plate member 100, the adhesive can escape more readily into the escape grooves 104B, if the escape grooves 104B are made to extend to the edges 110 and 112 of the thin plate member 100 and communicate with the outside air.

Next, a structure of the escape grooves 104 for resolving the above-described problems, ensuring rigidity and preventing warping will be explained. Below, items which are the same as or similar to those in FIG. 4 or 5 are denoted with the same reference numerals and description thereof is omitted.

Figure 6:
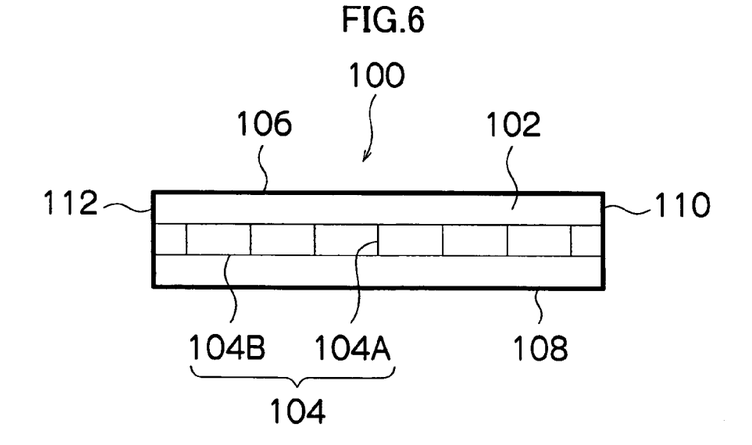
FIG. 6 is a plan diagram of a thin plate member according to an embodiment of the present invention.

FIG. 6 shows a mode of non-communicating grooves where the ends of the grooves 104A in the breadthways direction do not reach the edges 106 and 108 in the lengthwise direction of the thin plate member 100. In other words, the escape grooves 104A in the breadthways direction are formed between the escape grooves 104B running in the lengthwise direction. On the other hand, the escape grooves 104B in the lengthwise direction are formed in such a manner that they reach the shorter edges 110 and 112 of the thin plate member 100.

The escape grooves 104A are formed between the two escape grooves 104B in FIG. 6; however, the escape grooves 104A may also be formed between more than two escape grooves 104B. Furthermore, the escape grooves 104A should be formed so that they do not reach the edges 106 and 108, but they may be formed so as to intersect with the escape grooves 104B in such a manner that they project toward the edges 106 and 108 beyond the escape grooves 104B.

In the mode illustrated in FIG. 6, surplus adhesive in the central region of the thin plate member 100 cannot escape readily. Therefore, in a mode of single-edge-communicating grooves illustrated in FIG. 7, the escape grooves 104A are formed in such a manner that at least one end of each escape groove 104A in the breadthways direction reaches the longer edge 106 of the thin plate member 100, thereby communicating with the outside air. The other ends of the escape grooves 104A should be formed in such a manner that they do not reach the other longer edge 108 of the thin plate member 100.

Figure 7:
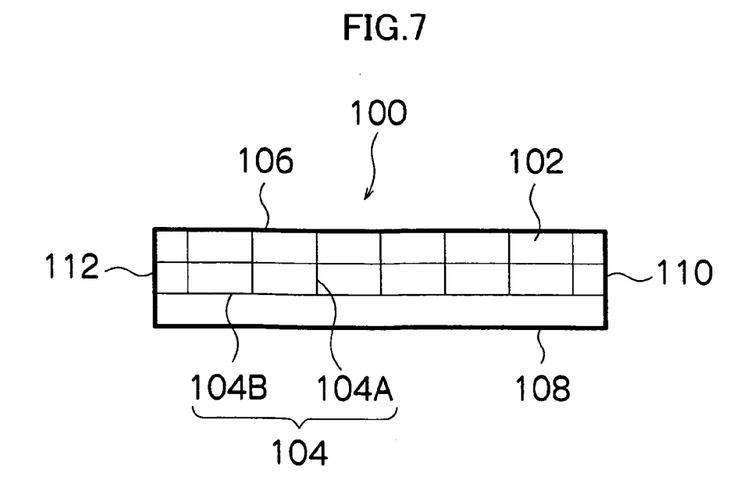
FIG. 7 is a diagram showing a modification of the escape grooves illustrated in FIG. 6.

In FIG. 7, the escape grooves 104A reach one longer edge 106, but do not reach the other longer edge 108. In other words, the escape grooves 104A have a structure where, at one end, they are open to the outside air at the longer edge 106 of the thin plate member 100, and at the other end, they are not open to the outside air at the longer edge 108 of the thin plate member 100. However, since the escape grooves 104A communicate with the escape grooves 104B, the ends of the escape grooves 104A that are not open to the air at the longer edge 108, are indirectly communicated with the outside air through the escape grooves 104B.

Figure 8:
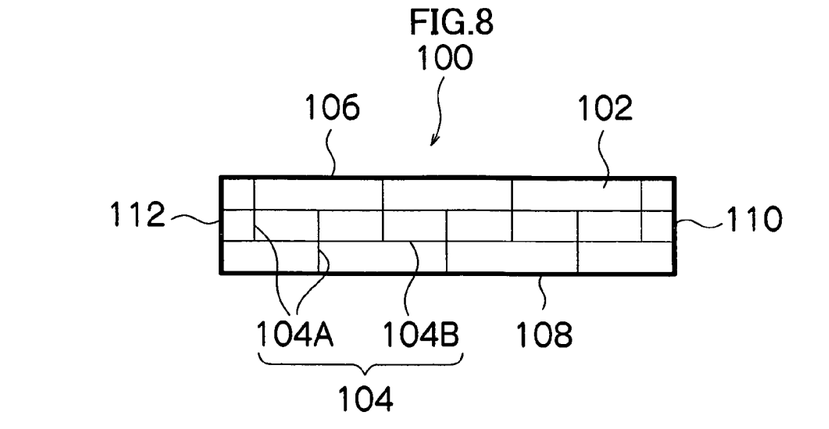
FIG. 8 is a diagram showing a further modification of the escape grooves illustrated in FIG. 6.

FIG. 8 shows a mode where the escape grooves 104A in the breadthways direction that reach the edge 106 (first single-edge-communicating grooves) and the escape grooves 104A which reach the edge 108 (second single-edge-communicating grooves) are arranged alternately. In the mode shown in FIG. 8, the surplus adhesive in the central region can escape more evenly, compared to the mode shown in FIG. 7.

FIG. 8 shows the mode where the escape grooves 104A in the breadthways direction that reach the edge 106 and the escape grooves 104A that reach the edge 108 are disposed alternately; however, the escape grooves 104A reaching the edge 106 and the escape grooves 104A reaching the edge 108 may be disposed every two or three grooves.

Figure 9:
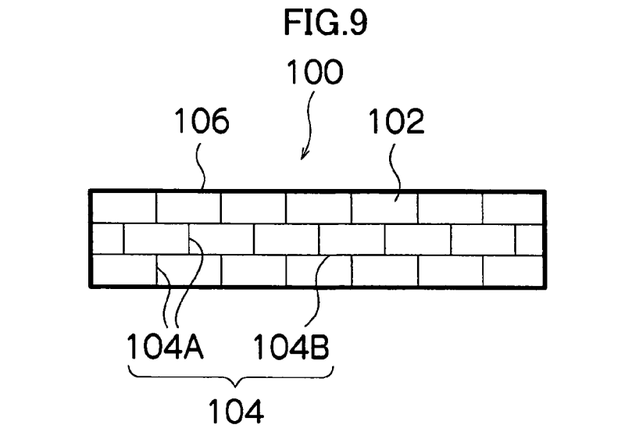
FIG. 9 is a diagram showing yet a further modification of the escape grooves illustrated in FIG. 6.

FIG. 9 shows a case where the modes in FIGS. 6 to 8 are combined. The escape grooves 104A in the breadthways direction are a combination of the escape grooves 104A having one end that extends to either one of the edges 106 or 108 of the thin plate member 100, and the escape grooves 104A having no ends reaching the edges 106 and 108.

In the mode illustrated in FIG. 9, the escape grooves 104A having one end reaching the edge 106 of the thin plate member 100 and the escape grooves 104A having one end reaching the edge 108 of the thin plate member 100 are disposed in substantially the same straight line. The escape grooves 104A, neither end of which reaches either of the edges 106 or 108 of the thin plate member 100, are disposed alternately between these escape grooves 104A having an end reaching one of the edges 106 or 108 of the thin plate member 100.

In the mode shown in FIG. 9, surplus adhesive in the central portion of the thin plate member 100 is able to pass along the escape grooves 104A in the breadthways direction, which suffer little pressure loss, rather than along the escape grooves 104B in the lengthwise direction, which suffer significant pressure loss. Hence, surplus adhesive in the central portion of the thin plate member 100 can escape readily.

FIGS. 6 to 9 show embodiments where the escape grooves 104 are formed on one bonding surface 102 of the thin plate member 100. FIGS. 10 to 13 show modes where the escape grooves 104 are also formed on the other bonding surface 120 of the thin plate member 100.

Figure 10:
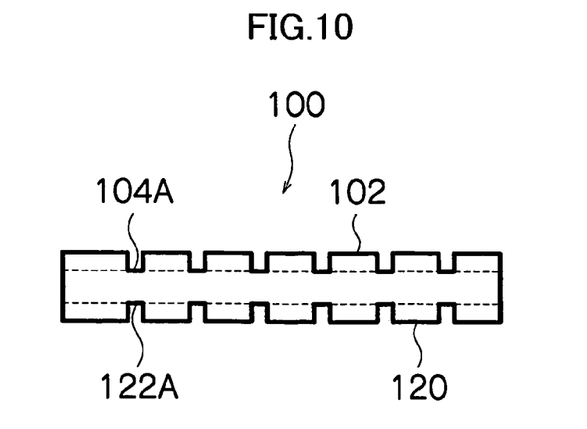
FIG. 10 is a cross-sectional diagram of a thin plate member having escape grooves formed on both surfaces thereof.

FIG. 10 is a cross-sectional view of the thin plate member 100 (corresponding to FIG. 5). As shown in FIG. 10, the escape grooves 104A in the breadthways direction are formed on the bonding surface 102 of the thin plate member 100, and escape grooves 122A in the breadthways direction are formed on the other bonding surface 120, which is the opposite face to the bonding surface 102.

If the escape grooves 104A and 122A are formed on both surfaces of the thin plate member 100 (i.e., the bonding surface 102 and the bonding surface 120) in this way, then warping in the lengthwise direction of the plate member 100 can be reduced, even if both ends of the escape grooves 104A and 122A communicate with both edges of the thin plate member 100.

Figure 11:
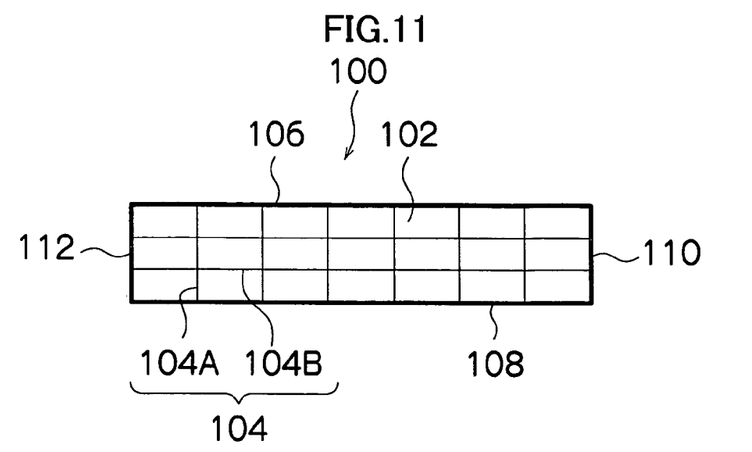
FIG. 11 is a plan diagram of the thin plate member illustrated in FIG. 10.

FIG. 11 is an approximate plan view of the thin plate member 100 shown in FIG. 10, showing the bonding surface 102. As shown in FIG. 11, the escape grooves 104A formed on the bonding surface 102 and the escape grooves 122A formed on the bonding surface 120 are situated in overlapping positions when viewed from the side of either of the bonding surfaces.

Figure 12:
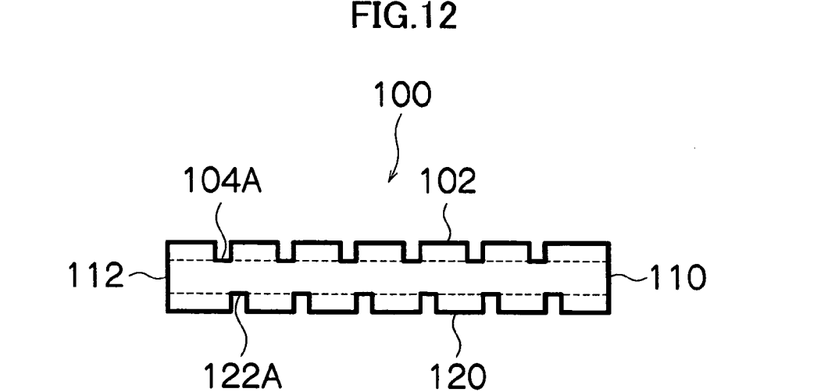
FIG. 12 is a diagram showing a modification of the escape grooves illustrated in FIG. 10.
Figure 13:
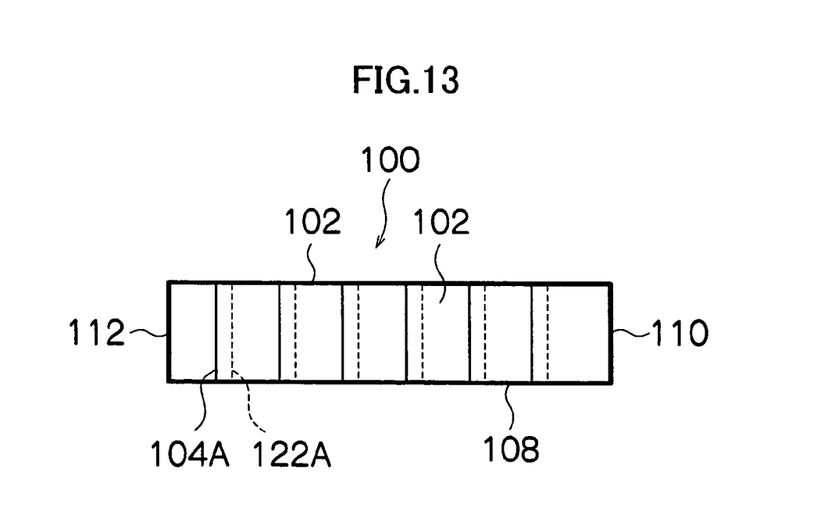
FIG. 13 is a plan diagram of the thin plate member illustrated in FIG. 12.

In the modes shown in FIGS. 10 and 11, it may not be possible to ensure the rigidity of the thin plate member 100. It is more preferable that the escape grooves 104A on the bonding surface 102 and the escape grooves 122A on the bonding surface 120 are formed in such a manner that they do not overlap when viewed from the side of either of the bonding surfaces, as illustrated in FIGS. 12 and 13. In FIGS. 12 and 13, the escape grooves 104A on the bonding surface 102 and the escape grooves 122A on the bonding surface 120 are formed in mutually divergent positions in the lengthwise direction (the lateral direction in FIGS. 12 and 13).

In order to increase the bonding surface area, it is necessary to reduce the width of the escape grooves 104 (122A). However, if the width of the escape grooves 104 is reduced, then the amount of adhesive that can escape into the grooves is also reduced.

Figure 14:
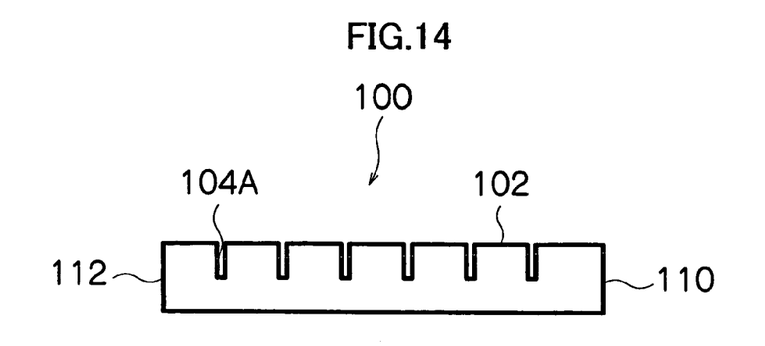
FIG. 14 is a cross-sectional diagram of a thin plate member formed with escape grooves having an aspect ratio exceeding 1.

Therefore, if the width of the escape grooves 104 is reduced (i.e., the grooves are made narrower) while their depth is increased as shown in FIG. 14, which is equivalent to a cross-sectional view along cross-section 5-5 in FIG. 4, then the bonding surface area can be increased whilst allowing the same amount of surplus adhesive to flow through the escape grooves 104. FIG. 14 shows the escape grooves 104A running in the breadthways direction, but of course, this may also be applied to the escape grooves 104B running in the lengthwise direction.

If the escape grooves 104A are thus formed, then both bonding strength and head rigidity can be increased. Furthermore, reducing the width of the escape grooves 104A allows surplus adhesive to escape more readily, due to capillary action, while also enabling high-density arrangement of the nozzles 51 formed in the thin plate member 100.

Figure 15:
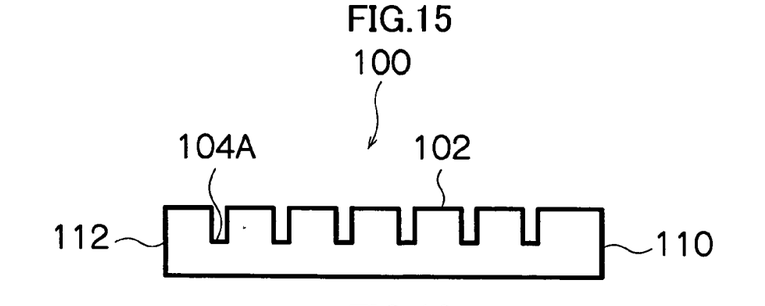
FIG. 15 is a diagram showing a modification of the escape grooves illustrated in FIG. 14.

FIG. 15, which is equivalent to a cross-section view along section 5-5 in FIG. 4, shows a mode where the escape grooves 104A in FIG. 14 are set to the same width as in the modes described previously. In the mode illustrated in FIG. 15, reliability is improved, since a larger amount of surplus adhesive is able to flow along the escape grooves 104A, in comparison to the mode shown in FIG. 14.

In the modes shown in FIGS. 14 and 15, the aspect ratio of the escape grooves 104A (the ratio of the depth to the width) is greater than 1. The aspect ratio is approximately 5 in the mode illustrated in FIG. 14, and the aspect ratio is approximately 2.5 in the mode illustrated in FIG. 15.

It is preferable that grooves (or recesses) having an aspect ratio exceeding 0.5 are formed by dry etching (deep etching), anisotropic etching on silicon, or the like. In the case of anisotropic etching on silicon, silicon is used as the material for the thin plate member 100.

The modes illustrated in FIGS. 10 to 13 where the escape grooves are formed on both bonding surfaces can be applied to the modes illustrated in FIGS. 14 and 15. However, if the escape grooves 104A and the escape grooves 122A are formed in the same positions when viewed from either of the bonding surfaces, as illustrated in FIG. 10, then in increasing the depth of the grooves, the distance between the escape grooves 104A formed on the bonding surface 102 and the escape grooves 122A formed on the bonding surface 120 becomes small in the depth direction in the thin plate member 100 (in other words, the thickness of the member is reduced). Therefore, it may not be possible to ensure the desired rigidity.

Consequently, it is preferable to adopt the mode illustrated in FIGS. 12 and 13, where the escape grooves 104A formed on the bonding surface 102 and the escape grooves 122A formed on the bonding surface 120 are situated in different (divergent) positions, when viewed from the side of either of the bonding surfaces, to the mode illustrated in FIG. 14 or 15.

Figure 16:
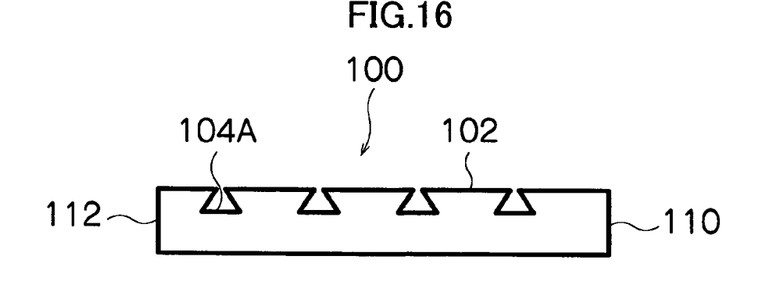
FIG. 16 is a diagram showing a further modification of the escape grooves illustrated in FIG. 14.
Figure 17:
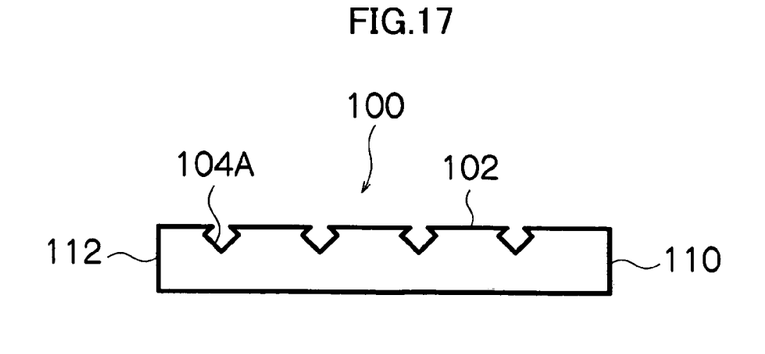
FIG. 17 is a diagram showing yet a further modification of the escape grooves illustrated in FIG. 14.

FIGS. 16 and 17 show the escape grooves 104 having cross-sections that are not rectangular in shape.

The escape grooves 104A shown in FIG. 16 have a broader width at the bottom than at the bonding surface 102, and therefore have an approximately triangular cross-sectional shape. By forming the escape grooves 104 having a shape of this kind, it is possible to ensure a larger bonding surface area.

FIG. 17 shows a mode where the cross-section of the escape grooves 104A is approximately diamond-shaped. Various other modes may also be adopted, but if a complicated shape is chosen for the cross-sectional shape of the escape grooves 104, it may become difficult to form the escape grooves 104. Therefore, a shape that is suited to the method used to form the escape grooves 104 (the method of manufacturing the respective thin plate members) should be adopted.

Figure 18A:
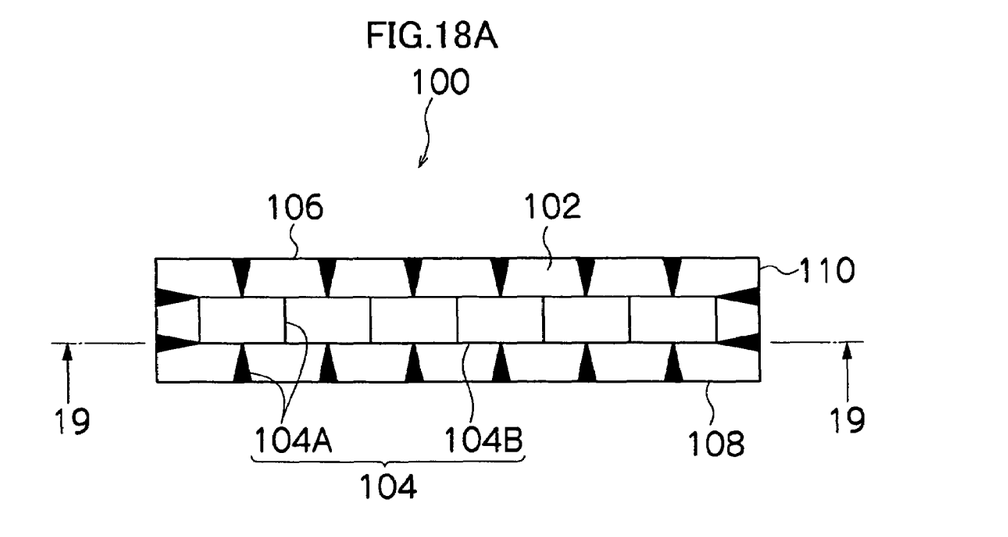
FIGS. 18A and 18B are diagrams showing escape grooves that are wider at the ends than in the central region.
Figure 18B:
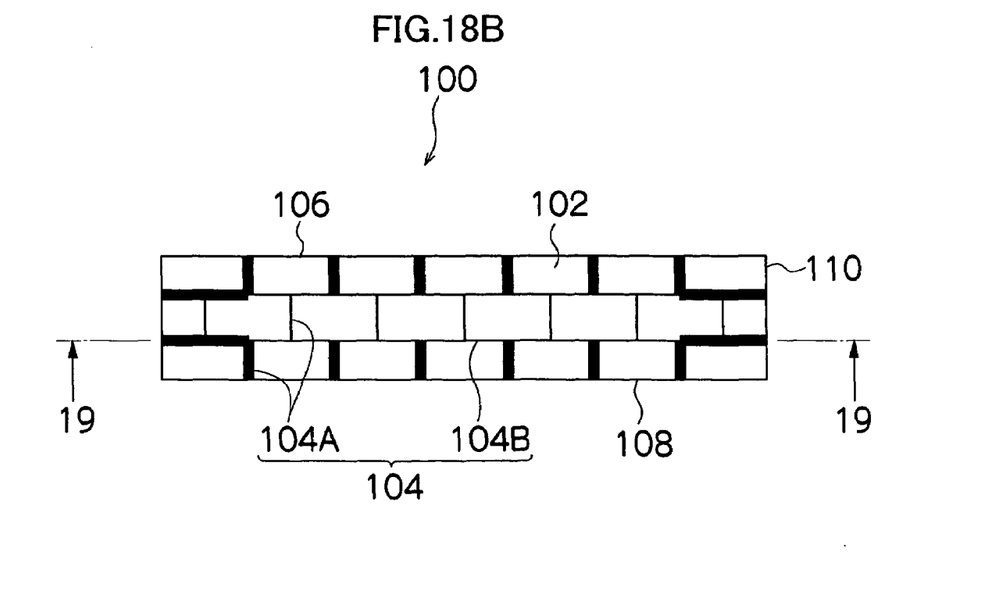
Figure 19:
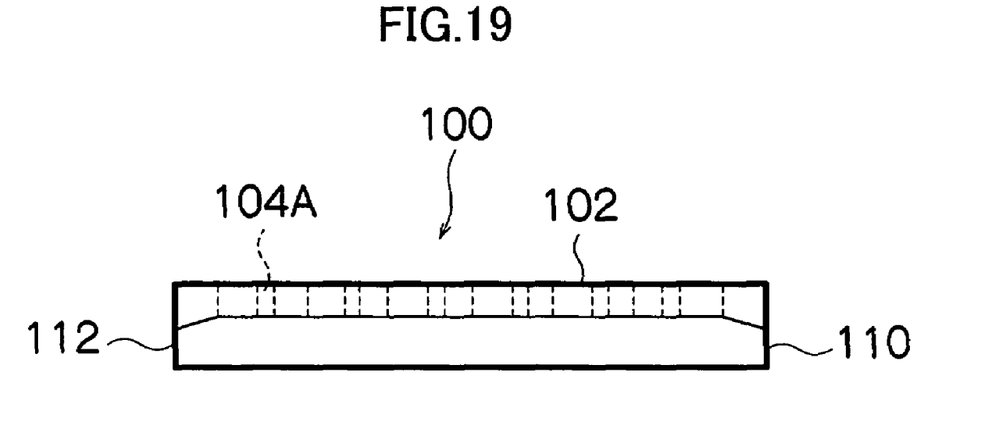
FIG. 19 is a cross-sectional view along line 19-19 in FIG. 18A or 18B.

FIGS. 18A, 18B and 19 show modes where the escape grooves 104A have greater width and depth at the edges 106 and 108 of the thin plate member 100, compared to those at the central region of the thin plate member 100. Similarly, the escape grooves 104B in the lengthwise direction also have greater width and depth at the ends 110 and 112 of the thin plate member 100, than those at the central region of the thin plate member 100. FIGS. 18A and 18B are approximate plan diagrams showing the bonding surface 102, and FIG. 19 is a cross-sectional view along line 19-19 in FIG. 18.

Theses examples show modes where both the width and depth of the escape grooves 104 increase from the central region towards the edges, but of course, this increase may be applied to the width only, or to the depth only.

The width of the escape grooves 104 may increase continuously from the central region towards the ends (such that the side faces of the grooves are flat) as shown in FIG. 18A, or the width of the escape grooves 104 may increase in steps (such that the side faces of the grooves contain steps) as shown in FIG. 18B. FIG. 18B shows the mode where the escape grooves 104 have two different widths (i.e., they change their width in two steps); however, the escape grooves 104 may have more than two different widths.

If the escape grooves 104 are thus formed as shown in FIGS. 18A, 18B and FIG. 19, then surplus adhesive on the bonding surfaces 102 (120) can be made to escape efficiently.

The present embodiments described a case where escape grooves 104 (122A) are formed in parallel to the breadthways direction and the lengthwise direction; however, they may also be formed at a certain non-right angle to the breadthways direction or lengthwise direction.

A metal, such as stainless steel, a ceramic, or silicon, for example, may be used as the material for the thin plate member 100. Of course, it is also possible to use members made from materials other than these. A suitable material should be selected by taking account of the processing method, processing accuracy, rigidity, and the like. Members of different materials may be used for the respective layers in the laminated structure.

The escape grooves 104 described above may be arranged on both of the surfaces to be bonded, or they may be arranged on either one of the surfaces. In other words, in the case of two thin plate members forming upper and lower layers, the lower surface of the thin plate member forming the upper layer is bonded with the upper surface of the thin plate member forming the lower layer. In this case, the escape grooves may be formed on both the lower surface of the thin plate member forming the upper layer and the upper surface of the thin plate member forming the lower layer, or the escape grooves may be formed on either one of the surfaces.

The respective modes described above may be adopted independently, or a plurality of modes may be combined.

The embodiments have been described in relation to a print head which is installed in an inkjet recording apparatus; however, the scope of the present invention is not limited to this example, and the present invention may also be applied to electronic components, and the like having a laminated structure formed by layering a plurality of members (or membranes).

For example, an inkjet recording apparatus to which the print head 50 is installed comprises: an ink supply unit for supplying ink to the print head 50; a conveyance unit for holding and conveying a recording medium which receives ink droplets ejected from the print head 50 (or a carriage unit for moving the print head 50 over a fixed recording medium); a fixing unit for fixing the deposited ink on the recording medium (or for making the deposited ink permeate in the recording medium); an output unit for outputting the recording medium having recorded from the recording apparatus; a print determination unit for determine an image recorded on the recording medium; a control unit for performing various control operations and producing print data from image data; and so on.

The print head 50 is also applicable to a discharging head which discharges liquid such as water, processing solution, and chemical (chemical solution) onto a discharged solution receiving medium, and the print head (discharging head) can be installed in a liquid discharging apparatus such as a dispenser.

In the thin plate member 100 having the composition described above, the escape grooves 104 are formed on the bonding surface 102 which is bonded with another thin plate member, in order to allow surplus adhesive and residual air bubbles between thin plate members to escape. The escape grooves 104 are arranged respectively in parallel to the breadthways direction and in parallel to the lengthwise direction of the thin plate member 100. Each of the escape grooves 104A in the breadthways direction is formed in such a manner that one end thereof reaches the edge 106 or 108 of the thin plate member 100, thereby communicating with the outside air, while the other end thereof does not reach the edge 106 nor 108 of the thin plate member 100. Thereby, surplus adhesive can be made to escape efficiently into the escape grooves 104, in addition to which, the rigidity of the thin plate member 100 can be ensured and warping of the thin plate member 100 in the lengthwise direction can be reduced. The escape grooves 104A in the breadthways direction may also be formed in such a manner that no ends thereof reach the edges 106 and 108 of the thin plate member 100.

Moreover, if the escape grooves 104 and 122A are provided on both surfaces (i.e., the bonding surface 102 and the bonding surface 120) of the thin plate member 100, then warping in the lengthwise direction of the thin plate member 100 can be reduced.

Furthermore, if the escape grooves 104 are of a shape having an aspect ratio exceeding 0.5, then the bonding surface area can be increased, while ensuring bonding strength. Moreover, since this allows the volume (cross-sectional area) of the escape grooves 104 to be increased, it means that a larger amount of surplus adhesive can escape. If the escape grooves 104 are formed in such a manner that they are of greater width at the ends of the thin plate member 100 than in the central region of the thin plate member 100, then surplus adhesive can be caused to escape efficiently.

It should be understood, however, that there is no intention to limit the invention to the specific forms disclosed, but on the contrary, the invention is to cover all modifications, alternate constructions and equivalents falling within the spirit and scope of the invention as expressed in the appended claims.

What is claimed is:

1. A laminated print head structure, comprising:
a plurality of thin plate members; and
adhesive which bonds the plurality of thin plate members in layers, wherein
at least one of the plurality of thin plate members has at least one bonding surface to be bonded with a surface of another of the plurality of thin plate members with the adhesive,
at least one groove is formed in a breadthways direction of the thin plate member on the bonding surface,
at least one groove is formed in a lengthwise direction of the thin plate member on the bonding surface,
at least one of ends of the at least one groove formed in the breadthways direction does not reach an edge of the thin plate member that extends in the length direction,
each end of the at least one groove formed in the lengthwise direction reaches respective opposing edges of the thin plate member that extend in the breadth direction,
the at least one groove formed in the breadthways direction and the at least one groove formed in the breadthways direction intersect with each other,
the at least one groove formed in the breadthways direction is provided to allow surplus adhesive and/or residual air bubbles to escape when the at least one bonding surface of the at least one of the plurality of thin plate members is bonded with the surface of another of the plurality of thin plate members, and
the at least one groove formed in the breadthways direction carries no ink during normal operation of the print head.

2. The laminated print head structure as defined in claim 1, wherein the at least one groove formed in the breadthways direction is a single-edge-communicating groove, one of the ends of which reaches an edge of the thin plate member that extends in the length direction.

3. The laminated print head structure as defined in claim 2, wherein
the bonding surface has a plurality of the single-edge-communicating grooves formed in the breadthways direction; and
the plurality of single-edge-communicating grooves formed in the breadthways direction include first single-edge-communicating grooves having ends reaching a first edge of the thin plate member that extends in the length direction, and second single-edge-communicating grooves having ends reaching a second edge of the thin plate member that extends in the length direction, opposite to the first edge.

4. The laminated print head structure as defined in claim 2, wherein the bonding surface further has a non-communicating groove formed in the breadthways direction having no ends reaching an edge of the thin plate member.

5. The laminated print head structure as defined in claim 3, wherein the bonding surface further has a non-communicating groove formed in the breadthways direction having no ends reaching an edge of the thin plate member.

6. The laminated print head structure as defined in claim 2, wherein a width of the single-edge-communicating groove formed in the breadthways direction increases from an interior of the thin plate member towards the one of the ends reaching the edge of the thin plate member.

7. The laminated print head structure as defined in claim 1, wherein each of both faces of the at least one of the plurality of thin plate members includes the bonding surface.

8. The laminated print head structure according to claim 7, wherein a plurality of grooves are formed on one of the bonding surfaces in the breadthways direction and are arranged in different positions with respect to the grooves formed on the other of the bonding surfaces in the breadthways direction.

9. A laminated print head structure, comprising:
a plurality of thin plate members; and
adhesive which bonds the plurality of thin plate members in layers, wherein
at least one of the plurality of thin plate members has at least one bonding surface to be bonded with a surface of another of the plurality of thin plate members with the adhesive,
at least one groove is formed in a breadthways direction of the thin plate member on the bonding surface,
at least one of ends of the groove does not reach an edge of the thin plate member,
each of both faces of the at least one of the plurality of thin plate members includes the bonding surface, and
for the at least one of the plurality of thin plate members that has both faces that includes the bonding surfaces, the grooves formed on one of the bonding surfaces are arranged in same positions with respect to the grooves formed on the other of the bonding surfaces.

10. A laminated print head structure, comprising:
a plurality of thin plate members; and
adhesive which bonds the plurality of thin plate members in layers, wherein
at least one of the plurality of thin plate members has at least one bonding surface to be bonded with a surface of another of the plurality of thin plate members with the adhesive,
at least one groove is formed in a breadthways direction of the thin plate member on the bonding surface,
at least one of ends of the groove does not reach an edge of the thin plate member, the at least one groove is provided to allow surplus adhesive and/or residual air bubbles to escape when the at least one bonding surface of the at least one of the plurality of thin plate members is bonded with the surface of another of the plurality of thin plate members, and the at least one groove carries no ink during normal operation of the print head, wherein a depth of the groove is greater than a width of the groove.

11. A laminated print head structure, comprising:

a plurality of thin plate members; and adhesive which bonds the plurality of thin plate members in layers, wherein at least one of the plurality of thin plate members has two bonding surfaces to be bonded with surfaces of others of the plurality of thin plate members with the adhesive, a groove is formed on each of the bonding surfaces, the groove on each of the bonding surfaces is provided to allow surplus adhesive and/or residual air bubbles to escape when said each of the bonding surfaces of the at least one of the plurality of thin plate members is bonded with the surface of another of the plurality of thin plate members, and the groove carries no ink during normal operation of the print head, wherein a depth of the groove is greater than a width of the groove.

12. A laminated print head structure, comprising:

a plurality of thin plate members; and adhesive which bonds the plurality of thin plate members in layers, wherein at least one of the plurality of thin plate members has two bonding surfaces to be bonded with surfaces of others of the plurality of thin plate members with the adhesive, a groove is formed on each of the bonding surfaces, the groove on each of the bonding surfaces is provided to allow surplus adhesive and/or residual air bubbles to escape when said each of the bonding surfaces of the at least one of the plurality of thin plate members is bonded with the surface of another of the plurality of thin plate members, and the groove carries no ink during normal operation of the print head, wherein a width of the groove increases from an interior of the thin plate member towards an edge of the thin plate member.

13. A laminated print head structure, comprising:

a plurality of thin plate members; and adhesive which bonds the plurality of thin plate members in layers, wherein at least one of the plurality of thin plate members has a bonding surface to be bonded with a surface of another of the plurality of thin plate members with the adhesive, a groove is formed on the bonding surface, a depth of the groove is greater than a width of the groove, the groove is provided to allow surplus adhesive and/or residual air bubbles to escape when the bonding surface of the at least one of the plurality of thin plate members is bonded with the surface of another of the plurality of thin plate members, and the groove carries no ink during normal operation of the print head.

* * * * *